Jan. 10, 1950   F. W. KORFMANN   2,493,880
GAS METER VALVE
Filed May 19, 1944
Fig. 1
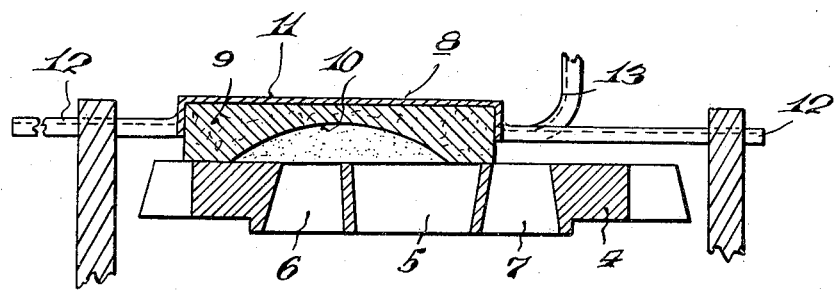
Fig. 2
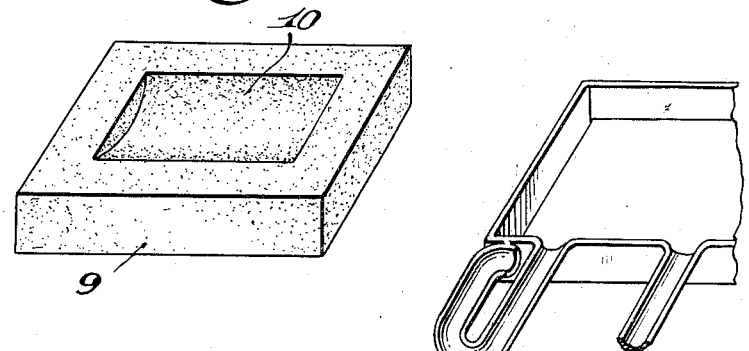
Fig. 3
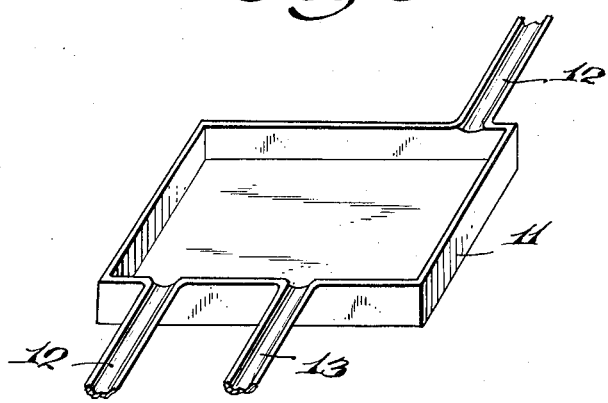
Fig. 4
Inventor
F. W. Korfmann,
By Prevost & Prevost
Attorneys Patented Jan. 10, 1950

2,493,880

UNITED STATES PATENT OFFICE 2,493,880

GAS METER VALVE

Frederick W. Korfmann, Long Island City, N. Y.

Application May 19, 1944, Serial No. 536,365

4 Claims. (Cl. 251—159)

This invention relates to improvements in valves and more particularly to valves of the type used in domestic gas meters. Such valves are usually made of metal, although proposals have been made to use other materials, due to difficulties encountered with metal valves. The gas being metered forms a gum on the metal valve now in use, and in some cases will cause errors in recordation of gas consumed, due to leakage of gas past the valve and excess valve drag. In other cases the gum resists the sliding movement of the valve to the extent that the drive arm shears at the point where it joins the shaft.

The primary object of the present invention is to provide an improved valve designed to eliminate the disadvantages heretofore encountered in the use of such valves.

Another object is to supply a combined carbon and metal valve including a metal stamping or shell bonded to carbon, the metal affording all of the mechanical driving and guiding means, and the carbon presenting a low friction seal face. Carbon, being nearly chemically inert, continues to slide freely over the metal grate now in use, after undergoing tests over a considerable period of time, but carbon is too brittle to be formed into guide rods of the valve. When metal guide rods or wires of small diameter are imbedded in the carbon, workmen accustomed to aligning guide rods, frequently broke the carbon slide in following the old method of installation. Rather than attempt a restraining program for the workmen, I propose a valve having the advantages of a carbon valve, but with guide rods which can be bent into alignment with pliers or the like.

Other features and advantages of the invention will appear from an examination of the drawings and the description hereinafter set forth. The invention may be contained in valves of different forms and to illustrate a practical application, I have selected a valve that is particularly adapted for gas meters, as an example of the different forms of construction that embody my invention. Such example is illustrated in the drawings in which:

Fig. 1 is a vertical sectional view of a valve seat and sliding valve, the latter embodying my invention.

Fig. 2 is a perspective view of the carbon slide portion of the valve in inverted position.

Fig. 3 is a similar view of the metal stamping or shell in which the carbon slide is bonded.

Fig. 4 is a fragmentary view like Fig. 3 but illustrating a modification.

Referring to the drawing, 4 designates a valve seat adapted to be mounted in the valve chamber of a gas meter in the ordinary manner, and provided with an outlet port 5 leading to the outlet of the meter, and inlet ports 6 and 7 leading to the main chamber of the meter.

Mounted upon the valve seat is a slide valve 8 comprising a carbon slide 9 having a recess 10 in its bottom through which the gas can travel from either one of the inlet ports to the outlet port of the valve seat. The slide is preferably formed of a single piece of molded carbon, or it may be a laminated structure built in accordance with the method disclosed in my application, Serial Number 517,999, dated January 12, 1944. The slide is combined with a metal stamping or shell 11, provided with oppositely extended integral guide members or rods 12 and an integral connection element or post 13 designed to be attached to the connecting rod (not shown) by which the valve is reciprocated in the known manner. Instead of guide rods, the shell may be provided with guide loops 12a of the type shown in Fig. 4.

The carbon slide and shell are preferably rectangular in top plan and the slide snugly fits the shell and projects below the same, as may be clearly seen in Fig. 1. The carbon slide may be secured to the shell by any suitable means—for instance, by a phenol-formaldehyde resin bonding agent. After the parts are assembled, or during assembly, the guide members or connection element of the metal stamping can be bent or manipulated for lining up pins for bearing supports and other mechanical members without damage to the carbon or the ensemble. This is an advantage over previous designs employing carbon, as making such adjustments usually resulted in breakage of carbon unless unusual care was employed.

It will, also, be apparent that my design has the advantages of cheapness of production, because of the employment of a single stamping or casting of any suitable metal, such as lead, steel, or copper, and a simple carbon cross section which is readily moldable. Previous designs required considerable machine and assembly work which increased the cost materially.

Another advantage of the metal-carbon composite design is that odd shapes and designs, not feasible in plain carbon, can readily be produced by practicing my invention.

Obviously, the same general construction can be employed in valves for other services.

While I have disclosed what I now consider to be a preferred embodiment of the invention so the same may be readily understood by those skilled in the art, it will be apparent that changes may be made in the details disclosed without departing from the spirit of the invention as expressed in the claims.

What I claim and desire to secure by Letters Patent is:

1. A valve substantially rectangular in plan and comprising a carbon insert housed at least partially within a metallic shell, said insert having a recessed face in which the recess extends only partially through the insert and is surrounded substantially by a rectangular border having a plane seat engageable face, and a bendable metallic connecting member projecting away from the shell.

2. A valve substantially rectangular in plan and comprising a carbon insert housed at least partially within a malleable metallic shell, said insert having a recessed face in which the recess extends only partially through the insert and is surrounded substantially by a rectangular border having a plane seat engageable face, oppositely extending bendable guide rods integral with and projecting from opposite sides of the shell, and a bendable metallic connecting element also integral with and projecting from the shell.

3. A valve comprising a substantially rectangular block impervious to materials handled by gas meters and having low friction characteristics, said block having a recess in one of its faces surrounded by a border having a plane seat engageable face, and a stamped metal shell enclosing the opposite face of the block and provided with an integral bendable metallic guide element projecting from the shell, said shell snugly embracing the block and being rigidly connected therewith.

4. A slide valve comprising an insert of a material impervious to fluids handled by gas meters and having low friction characteristics, said insert having a recess in one of its faces surrounded substantially by a border having a plane seat engageable face, and a stamped metal shell substantially enclosing the opposite face of the insert and provided with integral bendable metallic guide and connecting elements projecting from the shell, said shell snugly embracing the insert and being rigidly connected thereto.

FREDERICK W. KORFMANN.

REFERENCES CITED

The following references are of record in the file of this patent:

UNITED STATES PATENTS

| Number | Name | Date |
|---|---|---|
| 722,390 | Sprague | Mar. 10, 1903 |
| 828,280 | Firey | Aug. 7, 1906 |
| 1,649,235 | Jones | Nov. 15, 1927 |
| 1,814,608 | Schuh | July 14, 1931 |
| 1,835,686 | Allan | Dec. 8, 1931 |
| 1,854,651 | Goodall | Apr. 19, 1932 |
| 2,271,391 | Drake | Jan. 27, 1942 |

FOREIGN PATENTS

| Number | Country | Date |
|---|---|---|
| 392,279 | Great Britain | Of 1933 |
| 722,410 | France | Of 1932 |